US007044235B2

(12) United States Patent
Lin

(10) Patent No.: US 7,044,235 B2
(45) Date of Patent: May 16, 2006

(54) PNEUMATIC TOOL WITH SETTABLE SAFETY FUNCTION

(75) Inventor: Freddy Lin, Taichung (TW)

(73) Assignee: Gison Machinery Co., LTD, Taichung Hsien (TW)

( * ) Notice: Subject to any disclaimer, the term of this patent is extended or adjusted under 35 U.S.C. 154(b) by 27 days.

(21) Appl. No.: 10/879,172

(22) Filed: Jun. 30, 2004

(65) Prior Publication Data

US 2006/0000625 A1 Jan. 5, 2006

(51) Int. Cl.
*B23B 45/04* (2006.01)

(52) U.S. Cl. ...................................... 173/169; 173/170

(58) Field of Classification Search ................ 173/170, 173/169, 168, 171, 48; 451/295; 251/109, 251/107; 200/43.17
See application file for complete search history.

(56) References Cited

U.S. PATENT DOCUMENTS 3,632,936 A * 1/1972 Piber ......................... 200/1 V
3,746,813 A * 7/1973 Brown .................... 200/43.17
3,847,233 A * 11/1974 Glover et al. ............... 173/170
4,254,667 A * 3/1981 Wong .......................... 74/526
5,163,354 A * 11/1992 Bilodeau ..................... 91/428
6,644,419 B1 * 11/2003 Chen .......................... 173/169

* cited by examiner

*Primary Examiner*—Scott A. Smith
(74) *Attorney, Agent, or Firm*—Troxell Law Office, PLLC

(57) ABSTRACT

A pneumatic tool with settable safety function, including: a main body having a flow way for a fluid to flow into the main body to drive a pneumatic cylinder; a switch disposed in the main body for blocking the flow way in normal state; a trigger disposed on the main body for triggering the switch; a safety device movable between an activation position and a non-activation position; and a switching button connected with the safety device and switchable to position the safety device in the activation position or non-activation position. When the safety device is positioned in the activation position, the trigger can be pulled to shift the switch to activate the pneumatic tool, while when the safety device is positioned in the non-activation position, the trigger cannot be pulled to shift the switch so as to provide a safety effect.

8 Claims, 8 Drawing Sheets

PNEUMATIC TOOL WITH SETTABLE SAFETY FUNCTION

BACKGROUND OF THE INVENTION

The present invention is related to a pneumatic tool with settable safety function. A user can selectively switch the pneumatic tool into a safety mode or discharge the pneumatic tool from the safety mode.

A conventional pneumatic tool lacks any secure unit. Therefore, in case a user incautiously pulls the trigger to activate the pneumatic tool, the user or others may get injured.

The applicant's patent application Ser. No. 10/408,312 entitled "PNEUMATIC TOOL WITH SAFETY EFFECT" discloses a safety unit for pneumatic tool. Only after a user shifts the safety unit to a specific position, the trigger can be pulled to activate the pneumatic tool. Reversely, if the safety unit is not shifted to the specific position, it is impossible to directly pull the trigger to activate the pneumatic tool.

The above measure can achieve a protective effect. However, some users still customarily preferably directly pull the trigger to activate the pneumatic tool. Therefore, the applicant tries to develop a pneumatic tool with safety function settable by a user himself according to his own operation habit.

SUMMARY OF THE INVENTION

It is therefore a primary object of the present invention to provide a pneumatic tool with settable safety function. A user can selectively switch the pneumatic tool between a safety mode and a common mode as desired.

The present invention can be best understood through the following description and accompanying drawings wherein:

DETAILED DESCRIPTION OF THE PREFERRED EMBODIMENTS

Figure 1:
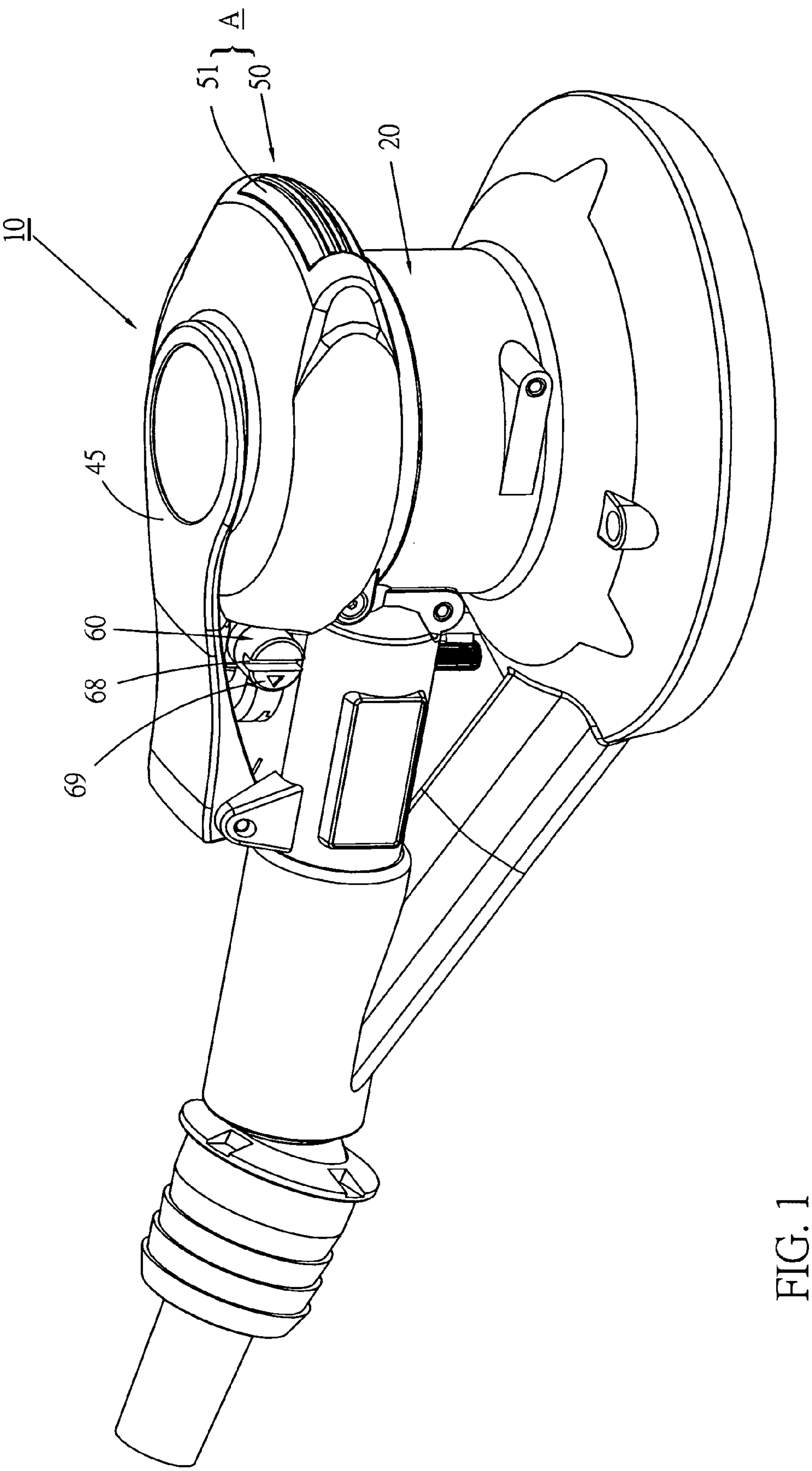
FIG. 1 is a perspective assembled view of a preferred embodiment of the present invention.
Figure 2:
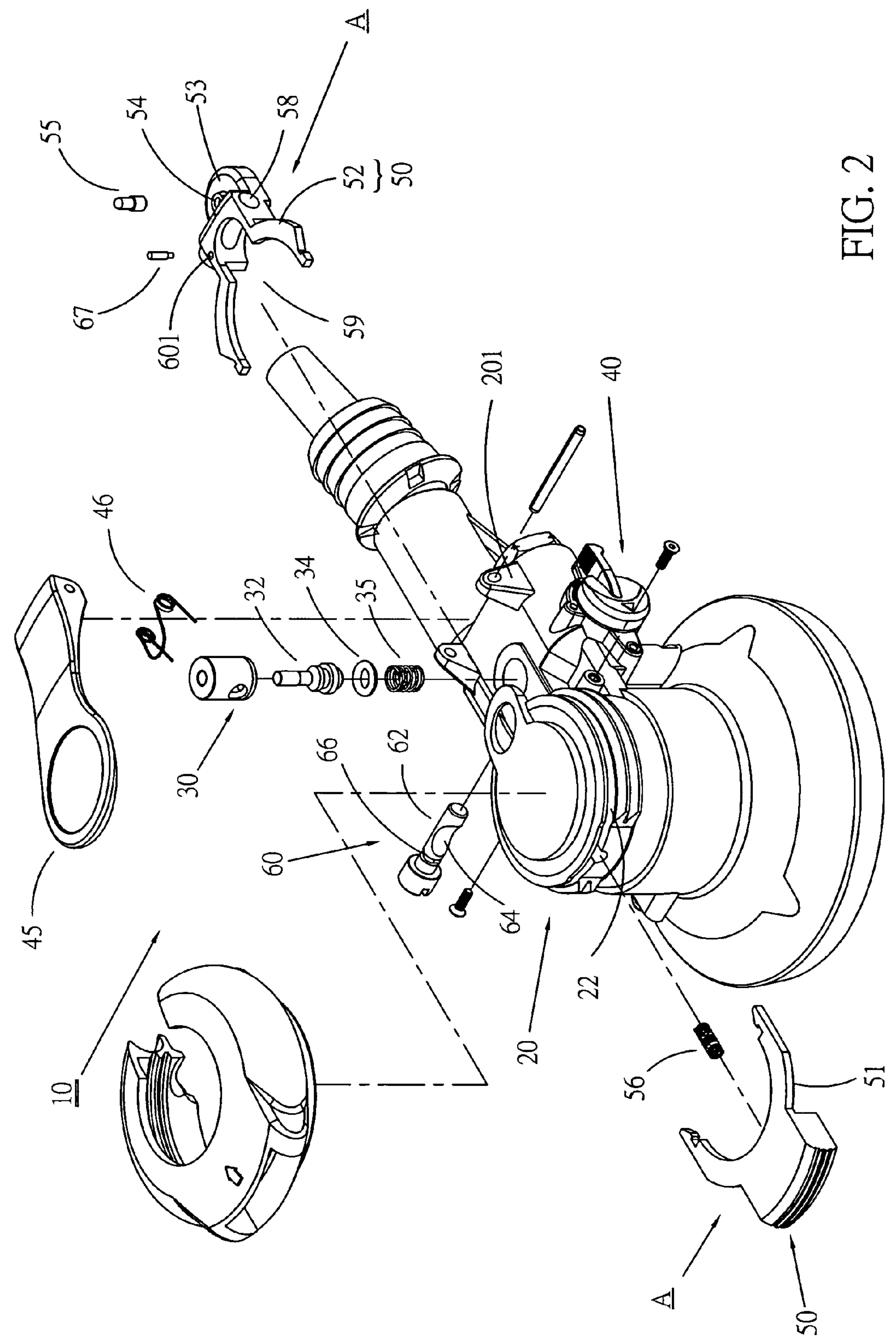
FIG. 2 is a perspective exploded view of the preferred embodiment of the present invention.
Figure 3:
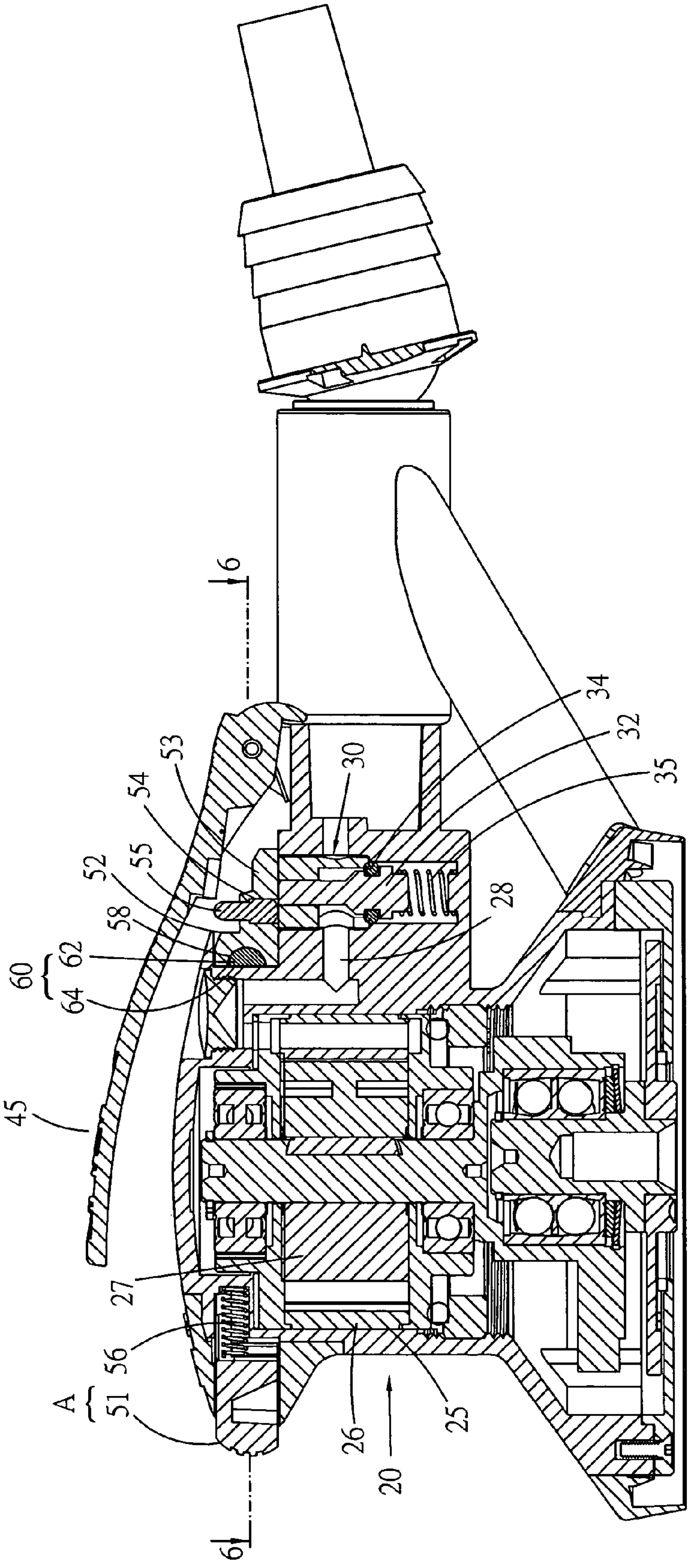
FIG. 3 is a longitudinal sectional view of the preferred embodiment of the present invention.

Please refer to FIGS. 1 and 2. According to a preferred embodiment, the pneumatic tool of the present invention is a pneumatic grinder equipped with a safety device disclosed in the aforesaid Patent Application. The pneumatic tool 10 includes a main body 20 in which a pneumatic cylinder chamber 25 is formed as shown in FIG. 3. A pneumatic cylinder 26 and a rotor 27 in the pneumatic cylinder 26 are installed in the pneumatic cylinder chamber 25. A flow way

28 is formed in the main body, through which high-pressure air can flow into the pneumatic cylinder.

A switch 30 is disposed in the main body 20 as shown in FIG. 3. The switch 30 has a valve member 32 having a valve section 34. In normal state, the valve member 32 is pushed by a resilient member 35, whereby the valve section 34 blocks the flow way 28.

A regulating button 40 is disposed in the main body 20 as shown in FIG. 2 for regulating the flow amount of the high-pressure air flowing into the main body.

A rear end of a trigger 45 is pivotally connected with a pair of lugs 201 of rear end of the main body 20, whereby the trigger 45 can be swung within a certain angle range. The trigger is forced by a torque spring 46, whereby in normal state, the trigger is kept lifted.

The safety device A includes a slide member 50 and a linking member 55. Referring to FIG. 2, the slide member 50 is composed of a front U-shaped half 51 and a rear U-shaped half 52 which are hooked with each other. The slide member 50 is back and forth slidably disposed in a guide groove 22 formed on the circumference of the main body 20. The linking member 55 is a touch pin up and down movably mounted in a through hole 54 of a platform 53 of rear end of the slide member 50. A resilient member 56 pushes front end of the slide member 50, whereby when no external pressing force is applied to the slide member 50, the slide member 50 is kept in a front dead end of the slide travel. Under such circumstance, the linking member 55 is nonaligned from the valve member 32 of the switch 30 as shown in FIG. 3.

The above structure is disclosed in the aforesaid Patent Application and will not be further described hereinafter.

In the state of FIG. 3, the linking member 55 is nonaligned from the valve member 32 so that when pulling the trigger 45, the switch 30 cannot be shifted to unblock the flow way 28. Therefore, the flow way 28 is kept blocked and the pneumatic tool cannot be activated.

Figure 4:
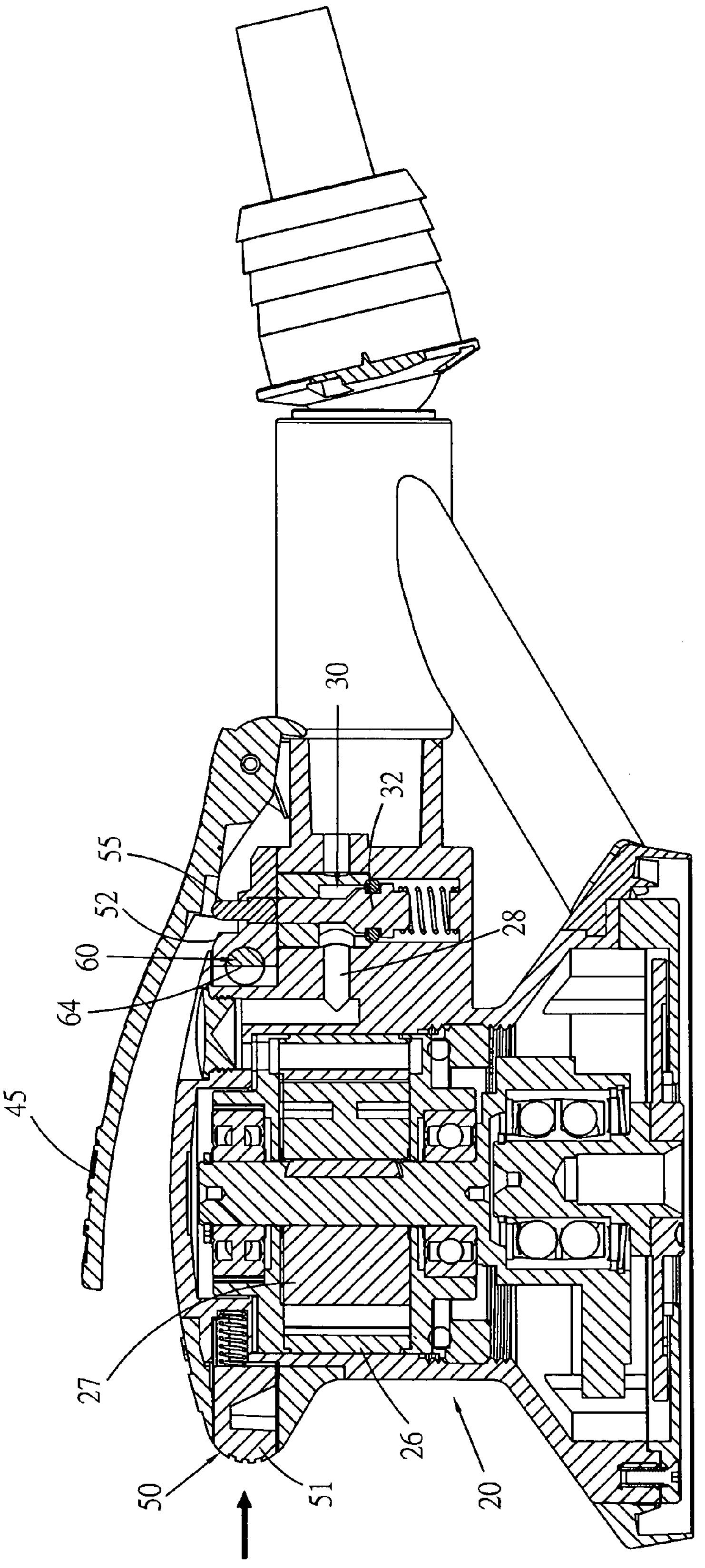
FIGS. 4 and 5 show that in safety mode, the safety device of the present invention is manually pressed and moved to the activation position.
Figure 5:
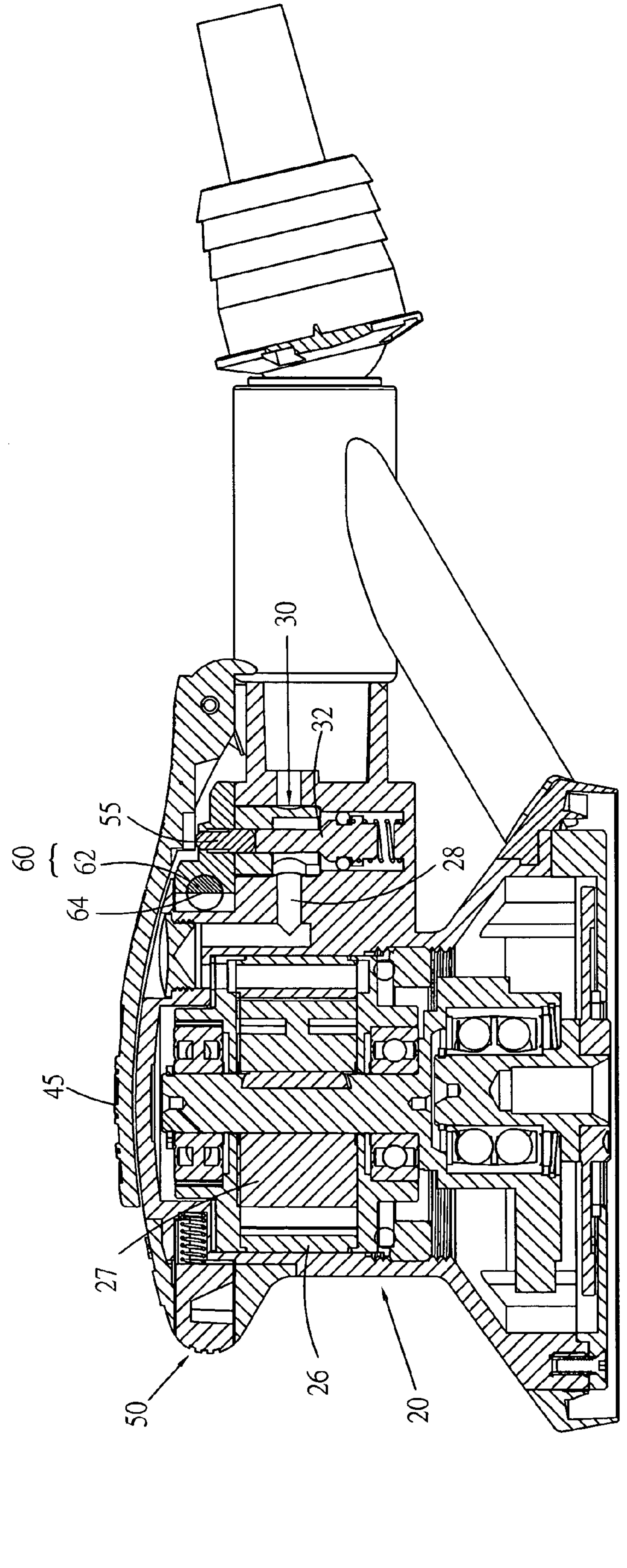

When it is desired to activate the pneumatic tool, a user must inward press the slide member 50 to make the slide member 50 slide toward rear side of the main body 20 into an activation position where the linking member 55 is vertically aligned with the valve member 32 as shown in FIG. 4. Under such circumstance, the trigger 45 can be pulled to drive the linking member to move downward and shift the valve member to an open position as shown in FIG. 5 for unblocking the flow way 28. At this time, the high-pressure air can flow into the pneumatic cylinder 26 to drive the rotor 27.

The present invention further includes the following structure.

The rear end of the slide member 50 is further formed with a transverse pivot hole 58 communicating with a hollow section 59 of the slide member.

A switching button 60 has a button body 62 with a cam function. The circumference of the button body 62 is formed with a cam section 64. The other section of the button body 62 is a common section. The switching button 60 is rotatably mounted in the pivot hole 58 with the button body 62 exposed to the hollow section 59 of the slide member 50. In this embodiment, the switch button is a circular pin formed with a groove 66. An insertion pin 67 is inserted through a pinhole 601 of the slide member into the groove 66 so as to prevent the switching button from dropping out. An outer end of the switching button is formed with a driven section 68 and a position mark 69 for a user to turn the switching button and judge the position thereof.

Figure 6:
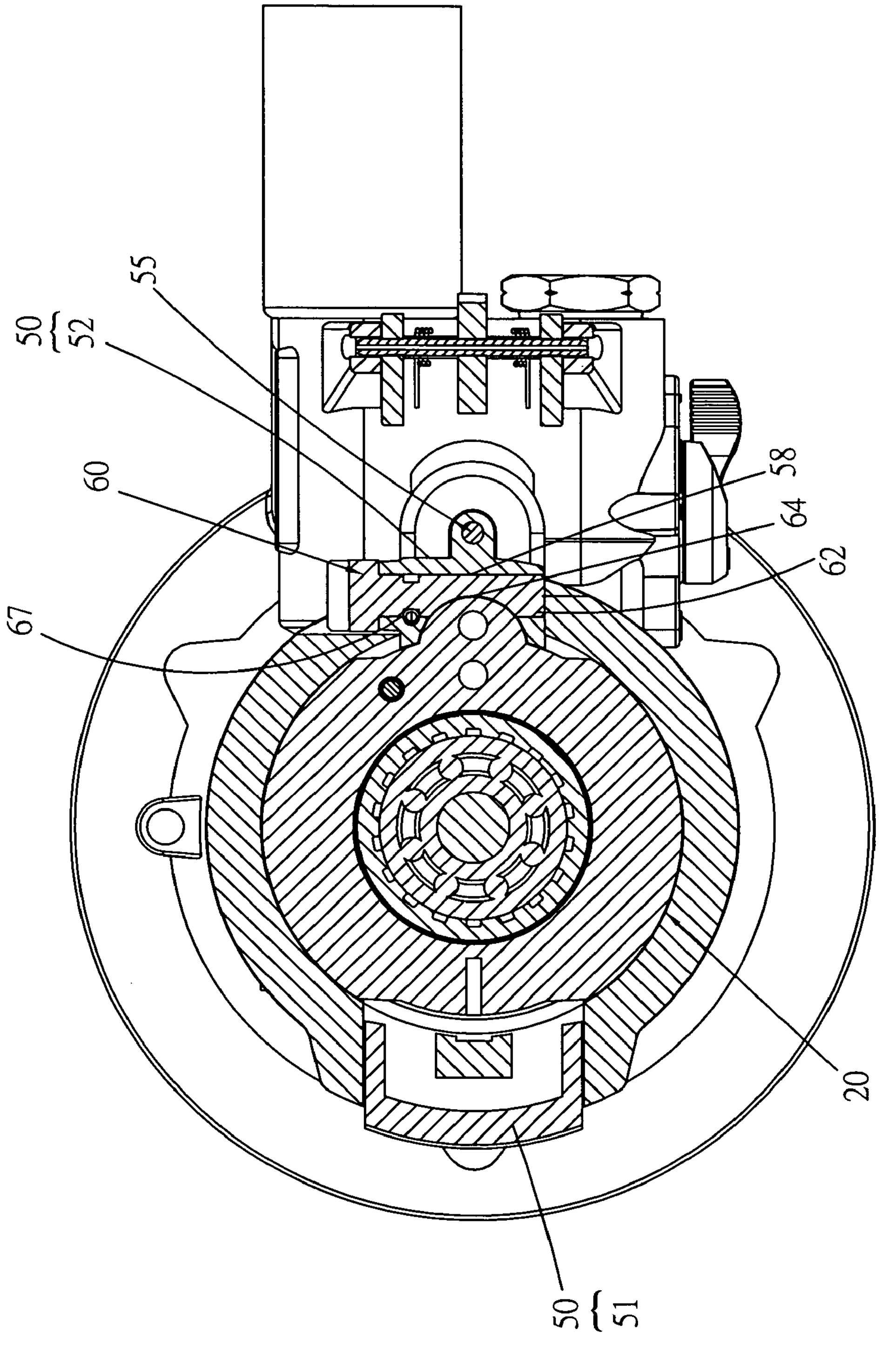
FIG. 6 is a sectional view taken along line 6—6 of FIG. 3.

Please refer to FIGS. 3 and 6 which show that the switching button 60 is switched to a first position, that is, safety mode position. At this time, the cam section 60 forward faces the main body 20. In normal state, the slide member 50 is pushed by the resilient member 56 and positioned at the front dead end with the cam section 64 attaching to the circumference of the main body 20. In this embodiment, the cam section 64 is a concave face which can snugly attach to the outer circumference of the main body. When the pneumatic tool is in the safety mode, the linking member 55 is nonaligned from the switch and the pneumatic tool cannot be activated.

Figure 7:
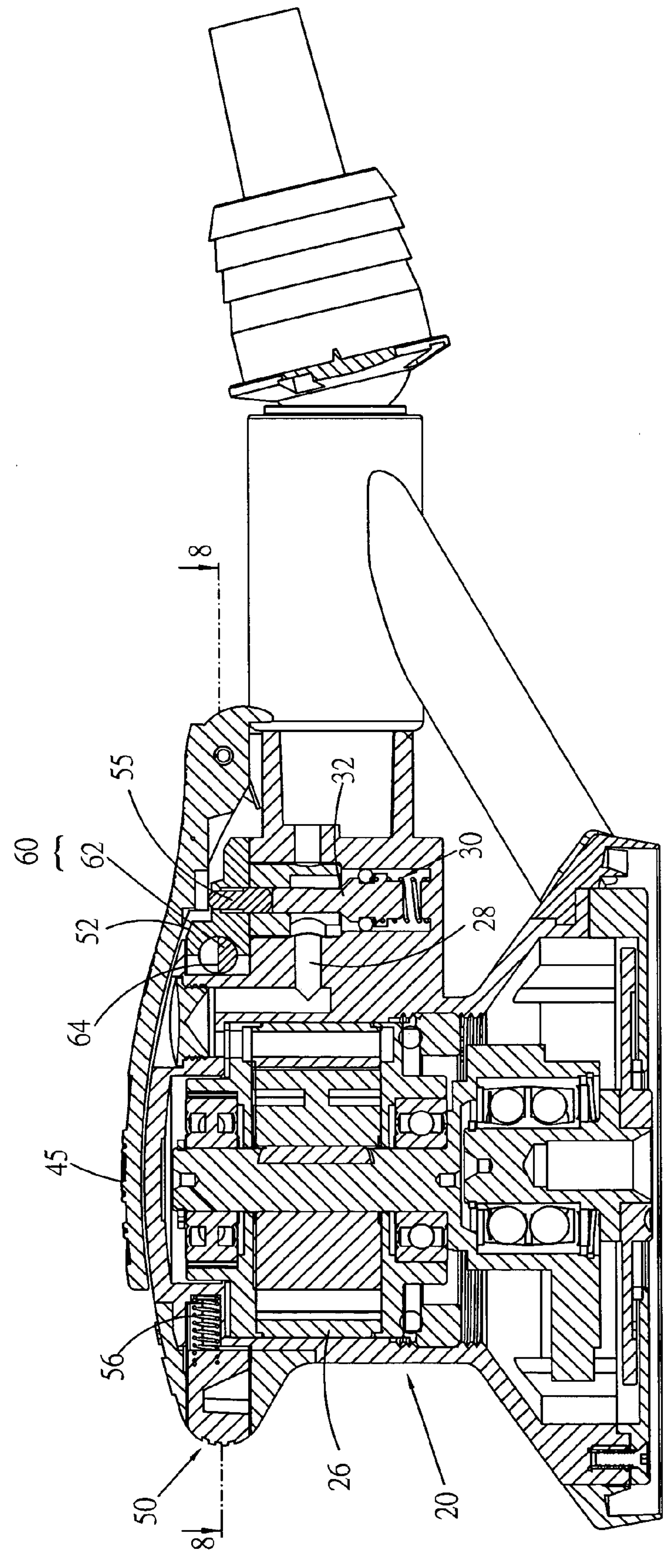
FIG. 7 is a longitudinal sectional view according to FIG. 3, showing that the safety device is set in the common mode.
Figure 8:
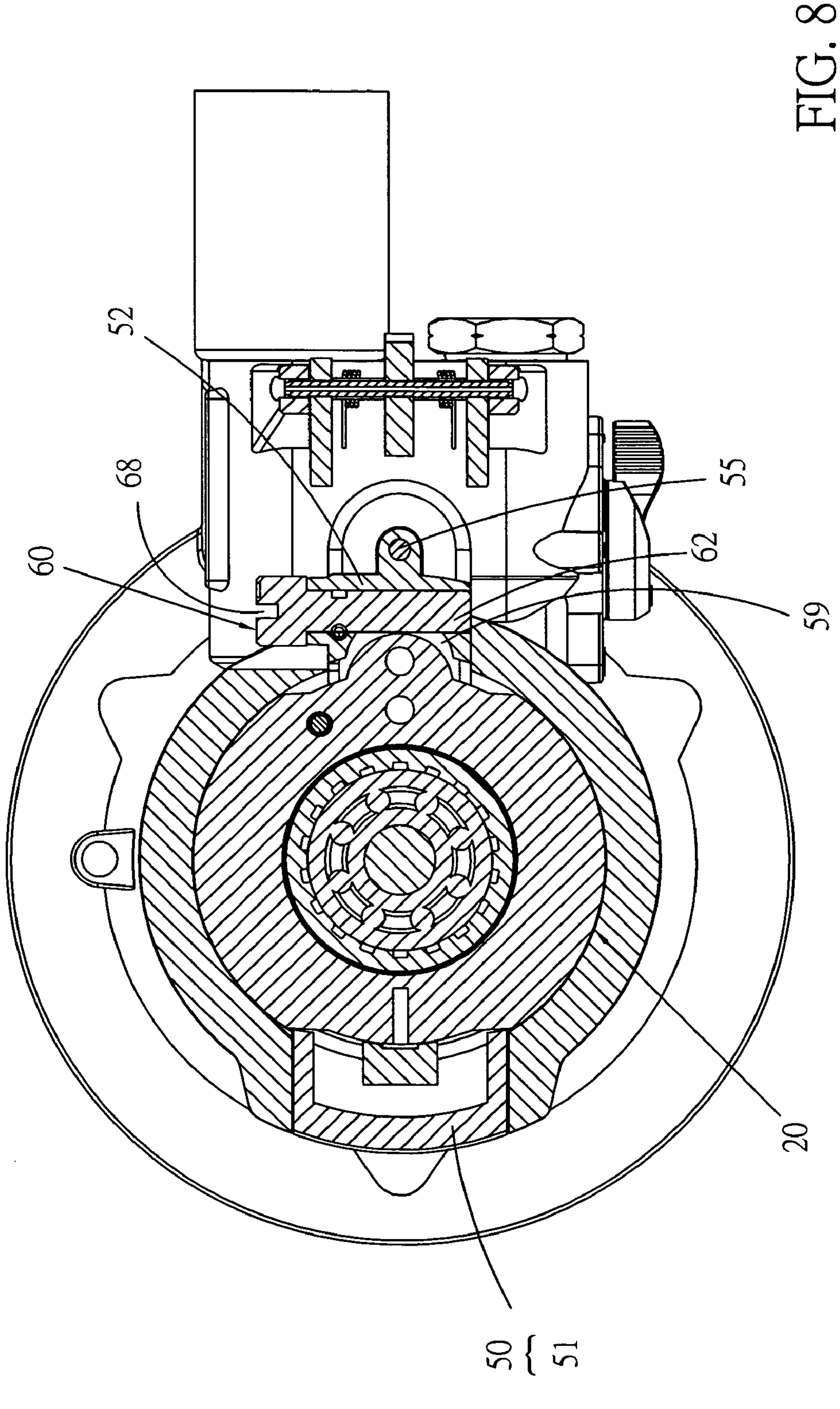
FIG. 8 is a sectional view taken along line 8—8 of FIG. 7.

When the user turns the switching button 60 by 90 or 180 degrees into a second position as shown in FIG. 7 (the switching button is 90 degrees turned), the cam section 64 of the button body 62 leaves the circumference of the main body and the general section of the button body turns to contact with the main body 20 as shown in FIGS. 7 and 8. By means of changing the angular position of the button body 62, the slide member 50 is moved rearward to the activation position. At this time, the pneumatic tool is discharged from the safety mode into a common mode. In the common mode, the linking member 55 is vertically aligned with the switch 40. At this time, the trigger 45 can be pulled to drive the linking member 55 to move downward and depress the valve member 42 of the switch 40 for unblocking the flow way 28. At this time, the high-pressure air can flow into the pneumatic cylinder 26 to operate the pneumatic tool.

When restored to the safety mode, the user only needs to turn the switching button 60 back to the position as shown in FIG. 3. Under such circumstance, the slide member 50 is again pushed by the resilient member 56 to move the front dead end.

According to the above arrangement, a switching structure is added to the structure of the aforesaid Patent Application. A user can set the pneumatic tool in the common mode or safety mode according to his/her own operation habit.

The profile of the cam section is not limited to the concave face. Alternatively, the cam section can be a protrusion and protrudes from the circumference of the button body. Accordingly, when the protruding cam section of the switching button contacts with the circumference of the main body, the slide member is positioned at the rear dead end of the sliding travel, that is, positioned in the activation position. At this time, the linking member is aligned with the switch and the trigger can be pulled to activate the pneumatic tool. Reversely, when the common section of the button body contacts with the circumference of the main body, the slide member positioned is positioned at the front dead end of the sliding travel, that is, positioned in the non-activation position. At this time, the linking member is nonaligned with the switch and the pneumatic tool cannot be activated.

The above embodiments are only used to illustrate the present invention, not intended to limit the scope thereof. Many modifications of the above embodiments can be made without departing from the spirit of the present invention.

What is claimed is:

1. A pneumatic tool with settable safety function, comprising:

a main body in which a cylinder chamber is formed for mounting a pneumatic cylinder therein; a flow way being formed in the main body and communicating with the cylinder chamber for conducting high-pressure air into the pneumatic cylinder;

a switch disposed in the main body and operable between an open position and a closed position, whereby when the switch is not shifted, the switch is kept in the closed position to block the flow way;

a safety device including a slide member and a linking member, the slide member being disposed around the main body and having a hollow section, one end of the slide member being formed with a transverse pivot hole communicating with the hollow section, the slide member being movable between an activation position and a non-activation position, the linking member being connected with the slide member, whereby when the slide member is positioned in the non-activation position, the linking member cannot drive the switch, while when the slide member is positioned in the activation position, the linking member can drive the switch, in normal state, the slide member being kept in the non-activation position;

a trigger, one end of which is pivotally connected with the main body, whereby when the slide member is positioned in the activation position, the trigger can be pulled to drive the linking member to shift the switch into the open position; and a switching button having a button body, a cam section being formed on a circumference of the button body, another section of the button body being a common section, the switching button being rotatably mounted in the pivot hole with the button body exposed to the hollow section of the slide member and contacting with the circumference of the main body, whereby when the cam section of the switching button contacts with the circumference of the main body, the safety device is positioned in the non-activation position, while when the common section of the button body contacts with the circumference of the main body, the safety device is positioned in the activation position.

2. The pneumatic tool as claimed in claim 1, wherein the cam section is a recessed section.

3. The pneumatic tool as claimed in claim 2, wherein the cam section is a concave face.

4. The pneumatic tool as claimed in claim 1, wherein the cam section protrudes from the common section of the button body. section is a concave face.

5. The pneumatic tool as claimed in claim 1, wherein the switch button is a circular rod, a circumference of the switch button being formed with a groove; an insertion pin being inserted through the slide member into the groove.

6. The pneumatic tool as claimed in claim 1, wherein outer end of the switching button is formed with a driven section.

7. The pneumatic tool as claimed in claim 1, wherein the switching button has a position mark.

8. A pneumatic tool with settable safety function, comprising:

a main body in which a cylinder chamber is formed for mounting a pneumatic cylinder therein; a flow way being formed in the main body and communicating with the cylinder chamber for conducting high-pressure air into the pneumatic cylinder;

a switch disposed in the main body and operable between an open position and a closed position, in normal state, the switch being positioned in the closed position to block the flow way;

a trigger, one end of which is pivotally connected with the main body;

a safety device disposed between the trigger and the switch and movable between an activation position and a non-activation position, whereby when the safety device is positioned in the non-activation position, the trigger cannot be pulled to drive the switch, while when the safety device is positioned in the activation position, the trigger can be pulled to shift the switch to the open position; and a switching button connected with the safety device and switchable between a first position and a second position to control the displacement of the safety device, whereby when the switching button is switched to the first position, the safety device is positioned in the non-activation position, while when the switching button is switched to the second position, the safety device is positioned in the activation position, wherein the safety device being formed with a pivot hole and the switching button having a cam section and a common section, the switching button being rotatably mounted in the pivot hole to contact with the circumference of the main body, whereby when the switching button is positioned in the first position, the cam section of the switching button contacts with the main body, while when the switching button is positioned in the second position, the common section of the switching button contacts with the main body.

* * * * *